(12) United States Patent
Jacobson et al.

(10) Patent No.: US 10,979,705 B2
(45) Date of Patent: Apr. 13, 2021

(54) METHOD FOR VIDEO CODING WITH SPATIAL PREDICTION MODE FOR MULTI-MODE VIDEO CODING

(71) Applicant: QUALCOMM Incorporated, San Diego, CA (US)

(72) Inventors: Natan Haim Jacobson, San Diego, CA (US); Vijayaraghavan Thirumalai, San Diego, CA (US); Rajan Laxman Joshi, San Diego, CA (US); Min Dai, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1218 days.

(21) Appl. No.: 14/819,306

(22) Filed: Aug. 5, 2015

(65) Prior Publication Data

US 2016/0044308 A1 Feb. 11, 2016

Related U.S. Application Data

(60) Provisional application No. 62/146,935, filed on Apr. 13, 2015, provisional application No. 62/035,363, filed on Aug. 8, 2014.

(51) Int. Cl.
| | |
|---|---|
| *H04N 19/105* | (2014.01) |
| *H04N 19/593* | (2014.01) |
| *H04N 19/112* | (2014.01) |
| *H04N 19/159* | (2014.01) |
| *H04N 19/174* | (2014.01) |
| *H04N 19/182* | (2014.01) |

(52) U.S. Cl.
CPC ......... *H04N 19/105* (2014.11); *H04N 19/112* (2014.11); *H04N 19/159* (2014.11); *H04N 19/174* (2014.11); *H04N 19/182* (2014.11); *H04N 19/593* (2014.11)

(58) Field of Classification Search
CPC .... H04N 11/04; H04N 19/149; H04N 19/152; H04N 19/174; H04N 19/124
See application file for complete search history.

(56) References Cited

U.S. PATENT DOCUMENTS

| | | | |
|---|---|---|---|
| 8,139,882 B2 * | 3/2012 | Huguenel | H04N 19/60 375/240.03 |
| 2005/0015259 A1 * | 1/2005 | Thumpudi | G10L 19/24 704/500 |

(Continued)

OTHER PUBLICATIONS

International Search Report and Written Opinion—PCT/US2015/044067—ISA/EPO—dated Nov. 3, 2015.

(Continued)

*Primary Examiner* — Frank F Huang
(74) *Attorney, Agent, or Firm* — Shumaker & Sieffert, P.A.

(57) ABSTRACT

A method and apparatus for video coding with spatial prediction mode for multi-mode video coding is disclosed. In one aspect, the method includes coding a slice of video data, the slice including a plurality of pixels organized into a first line and a plurality of non-first lines. The coding of the slice further includes coding a current pixel of the first line in a spatial prediction mode using a previous pixel of the first line as a predictor and coding another pixel of a non-first line in a coding mode other than the spatial prediction mode.

36 Claims, 11 Drawing Sheets

(56) References Cited

U.S. PATENT DOCUMENTS

| | | | | |
|---|---|---|---|---|
| 2007/0009163 A1* | 1/2007 | Sasaki | .................... | H04N 19/61 |
| | | | | 382/238 |
| 2007/0071094 A1* | 3/2007 | Takeda | ................. | H04N 19/197 |
| | | | | 375/240.04 |
| 2011/0255595 A1* | 10/2011 | Zuo | ...................... | H04N 19/176 |
| | | | | 375/240.03 |
| 2011/0310967 A1* | 12/2011 | Zhang | ................. | H04N 19/176 |
| | | | | 375/240.12 |
| 2013/0051457 A1* | 2/2013 | Joshi | ................... | H04N 19/147 |
| | | | | 375/240.03 |
| 2014/0092960 A1* | 4/2014 | MacInnis | ............. | H04N 19/149 |
| | | | | 375/240.03 |

OTHER PUBLICATIONS

Peng X., et al., "TE6.a: Report of line-based coding", 94. MPEG Meeting; Oct. 11, 2010-Oct. 15, 2010; Guangzhou; (Motion Picture Expert Group or ISO/IEC JTC1/SC29/WG11), No. M18313, Oct. 13, 2010 (Oct. 13, 2010), XP030046903, 5 pages.

Walls F., et al., "BDC-1: A robust algorithm for display stream compression", 2013 Picture Coding Symposium (PCS), IEEE, Dec. 8, 2013 (Dec. 8, 2013), pp. 434-437, XP032567035.

* cited by examiner

METHOD FOR VIDEO CODING WITH SPATIAL PREDICTION MODE FOR MULTI-MODE VIDEO CODING

INCORPORATION BY REFERENCE TO PRIORITY APPLICATIONS

This application claims the benefit of U.S. Provisional Application No. 62/035,363, filed Aug. 8, 2014 and U.S. Provisional Application No. 62/146,935, filed Apr. 13, 2015.

TECHNICAL FIELD

This disclosure relates to the field of video coding and compression, and particularly to video compression for transmission over display links, such as display link video compression.

BACKGROUND

Digital video capabilities can be incorporated into a wide range of displays, including digital televisions, personal digital assistants (PDAs), laptop computers, desktop monitors, digital cameras, digital recording devices, digital media players, video gaming devices, video game consoles, cellular or satellite radio telephones, video teleconferencing devices, and the like. Display links are used to connect displays to appropriate source devices. The bandwidth requirements of display links are proportional to the resolution of the displays, and thus, high-resolution displays require large bandwidth display links. Some display links do not have the bandwidth to support high resolution displays. Video compression can be used to reduce the bandwidth requirements such that lower bandwidth display links can be used to provide digital video to high resolution displays.

Others have tried to utilize image compression on the pixel data. However, such schemes are sometimes not visually lossless or can be difficult and expensive to implement in conventional display devices.

The Video Electronics Standards Association (VESA) has developed Display Stream Compression (DSC) as a standard for display link video compression. The display link video compression technique, such as DSC, should provide, among other things, picture quality that is visually lossless (i.e., pictures having a level of quality such that users cannot tell the compression is active). The display link video compression technique should also provide a scheme that is easy and inexpensive to implement in real-time with conventional hardware.

SUMMARY

The systems, methods and devices of this disclosure each have several innovative aspects, no single one of which is solely responsible for the desirable attributes disclosed herein.

In one aspect, a method for coding video data via a plurality of coding modes in display link video compression comprises coding a slice of the video data, the slice comprising a plurality of pixels in a first line of the slice and a plurality of non-first lines of the slice, the coding of the slice comprising: coding a current pixel of the first line of the slice in a spatial prediction mode using a previous pixel of the first line as a predictor; and coding another pixel of a non-first line of the slice in a coding mode other than the spatial prediction mode.

In another aspect, a device for coding video data via a plurality of coding modes in display link video compression comprises a memory configured to store the video data; and a processor in communication with the memory and configured to: code a slice of the video data, the slice comprising a plurality of pixels in a first line of the slice and a plurality of non-first lines of the slice; code a current pixel of the first line of the slice in a spatial prediction mode using a previous pixel of the first line as a predictor; and code another pixel of a non-first line of the slice in a coding mode other than the spatial prediction mode.

In another aspect, an apparatus comprises means for coding a slice of the video data, the slice comprising a plurality of pixels in a first line of the slice and a plurality of non-first lines of the slice; means for coding a current pixel of the first line of the slice in a spatial prediction mode using a previous pixel of the first line as a predictor; and means for coding another pixel of a non-first line of the slice in a coding mode other than the spatial prediction mode.

In another aspect, a non-transitory computer readable storage medium has stored thereon instructions that, when executed, cause a processor of a device to code a slice of the video data, the slice comprising a plurality of pixels in a first line of the slice and a plurality of non-first lines of the slice; code a current pixel of the first line of the slice in a spatial prediction mode using a previous pixel of the first line as a predictor; and code another pixel of a non-first line of the slice in a coding mode other than the spatial prediction mode.

DETAILED DESCRIPTION

Figure 1A:
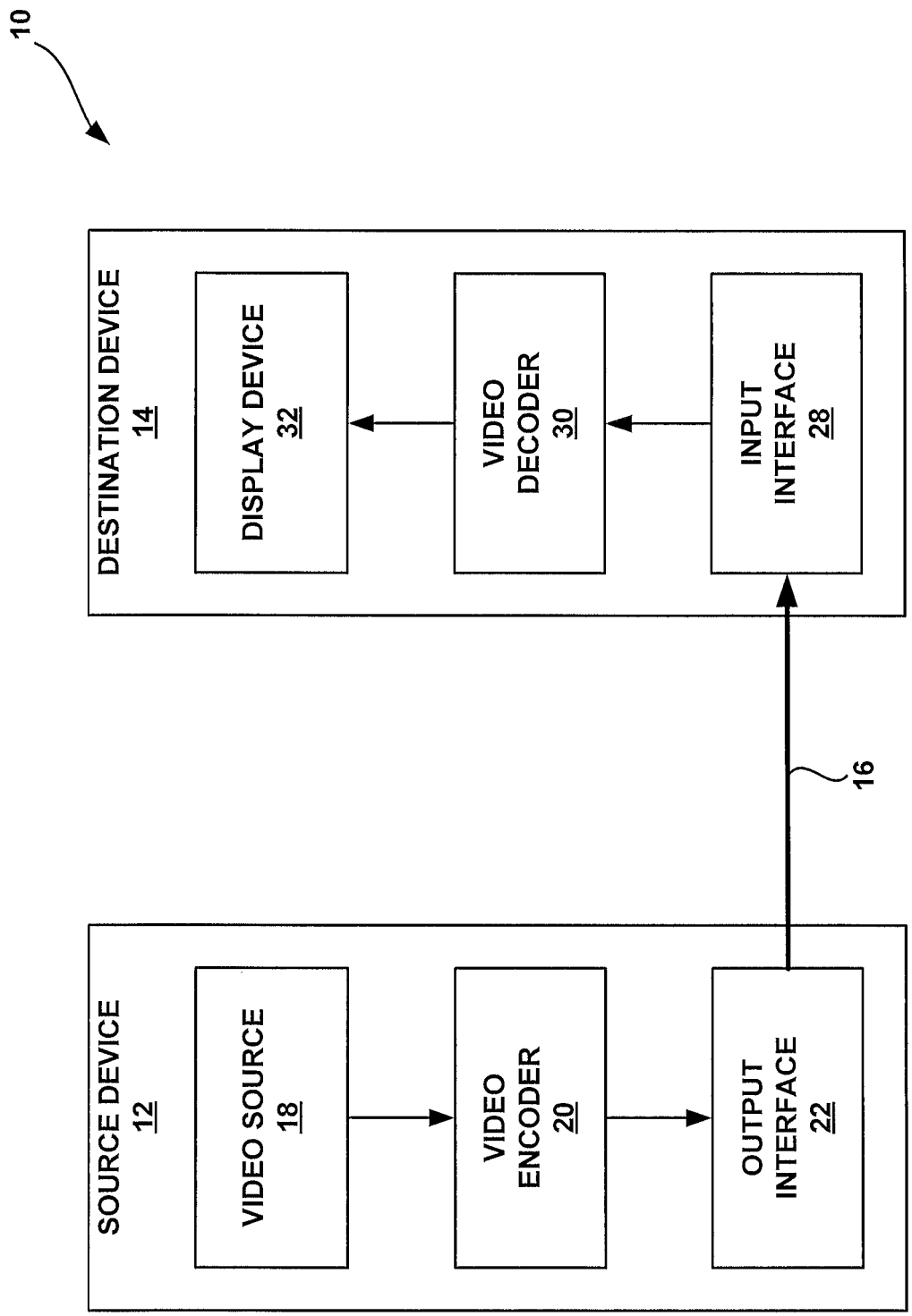
FIG. 1A is a block diagram illustrating an example video encoding and decoding system that may utilize techniques in accordance with aspects described in this disclosure.

In general, this disclosure relates to methods of improving video compression techniques such as those utilized in display link video compression. More specifically, the present disclosure relates to systems and methods for improving the coding efficiency of a first line in a slice when using multi-mode coding techniques.

While certain embodiments are described herein in the context of the DSC standard, one having ordinary skill in the art would appreciate that systems and methods disclosed herein may be applicable to any suitable video coding standard. For example, embodiments disclosed herein may be applicable to one or more of the following standards: International Telecommunication Union (ITU) Telecommunication Standardization Sector (ITU-T) H.261, International Organization for Standardization/International Electrotechnical Commission (ISO/IEC) Moving Picture Experts Group-1 (MPEG-1) Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), High Efficiency Video Coding (HEVC), and any extensions to such standards. Also, the techniques described in this disclosure may become part of standards developed in the future. In other words, the techniques described in this disclosure may be applicable to previously developed video coding standards, video coding standards currently under development, and forthcoming video coding standards.

A proposed methodology for the DSC standard includes a number of coding modes in which each block of video data may be encoded by an encoder and, similarly, decoded by a decoder. In some implementations, the pixels of an image may be coded using a plurality of different coding modes (i.e., using multi-mode video coding). However, some of the modes used in coding a slice of the image may have better performance for lines of the slice other than the first line of the slice. For example, certain video coding modes may take advantage of predictors that are located spatially above a current pixel to be coded. Since the first line of a slice is not able to access predictors that are located spatially above the first line of the slice (i.e., previous lines are not available for the coding of a first line of a slice), these video coding techniques may have a reduced coding quality for the first line of the slice.

In the present disclosure, an improved method of coding a first line of a slice using a spatial prediction mode is described. For example, pixels of the first line of the slice may be coded using previous pixels of the first line as predictors. In other words, a previous pixel which is located before a current pixel to be coded in the first line of the slice may be used as a predictor when coding the current pixel. The previous pixel may be spatially located prior to the current pixel in coding order. This may improve the coding quality of the first line of the slice without access to previous lines located above the first line of the slice.

Video Coding Standards

A digital image, such as a video image, a TV image, a still image or an image generated by a video recorder or a computer, may include pixels or samples arranged in horizontal and vertical lines. The number of pixels in a single image is typically in the tens of thousands. Each pixel typically contains luminance and chrominance information. Without compression, the sheer quantity of information to be conveyed from an image encoder to an image decoder would render real-time image transmission impractical. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), and HEVC including extensions of such standards.

In addition, a video coding standard, namely DSC, has been developed by VESA. The DSC standard is a video compression standard which can compress video for transmission over display links. As the resolution of displays increases, the bandwidth of the video data required to drive the displays increases correspondingly. Some display links may not have the bandwidth to transmit all of the video data to the display for such resolutions. Accordingly, the DSC standard specifies a compression standard for interoperable, visually lossless compression over display links.

The DSC standard is different from other video coding standards, such as H.264 and HEVC. DSC includes intra-frame compression, but does not include inter-frame compression, meaning that temporal information may not be used by the DSC standard in coding the video data. In contrast, other video coding standards may employ inter-frame compression in their video coding techniques.

Video Coding System

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

FIG. 1A is a block diagram that illustrates an example video coding system 10 that may utilize techniques in accordance with aspects described in this disclosure. As used described herein, the term "video coder" or "coder" refers generically to both video encoders and video decoders. In this disclosure, the terms "video coding" or "coding" may refer generically to video encoding and video decoding. In addition to video encoders and video decoders, the aspects described in the present application may be extended to other related devices such as transcoders (e.g., devices that can decode a bitstream and re-encode another bitstream) and middleboxes (e.g., devices that can modify, transform, and/or otherwise manipulate a bitstream).

Figure 1B:
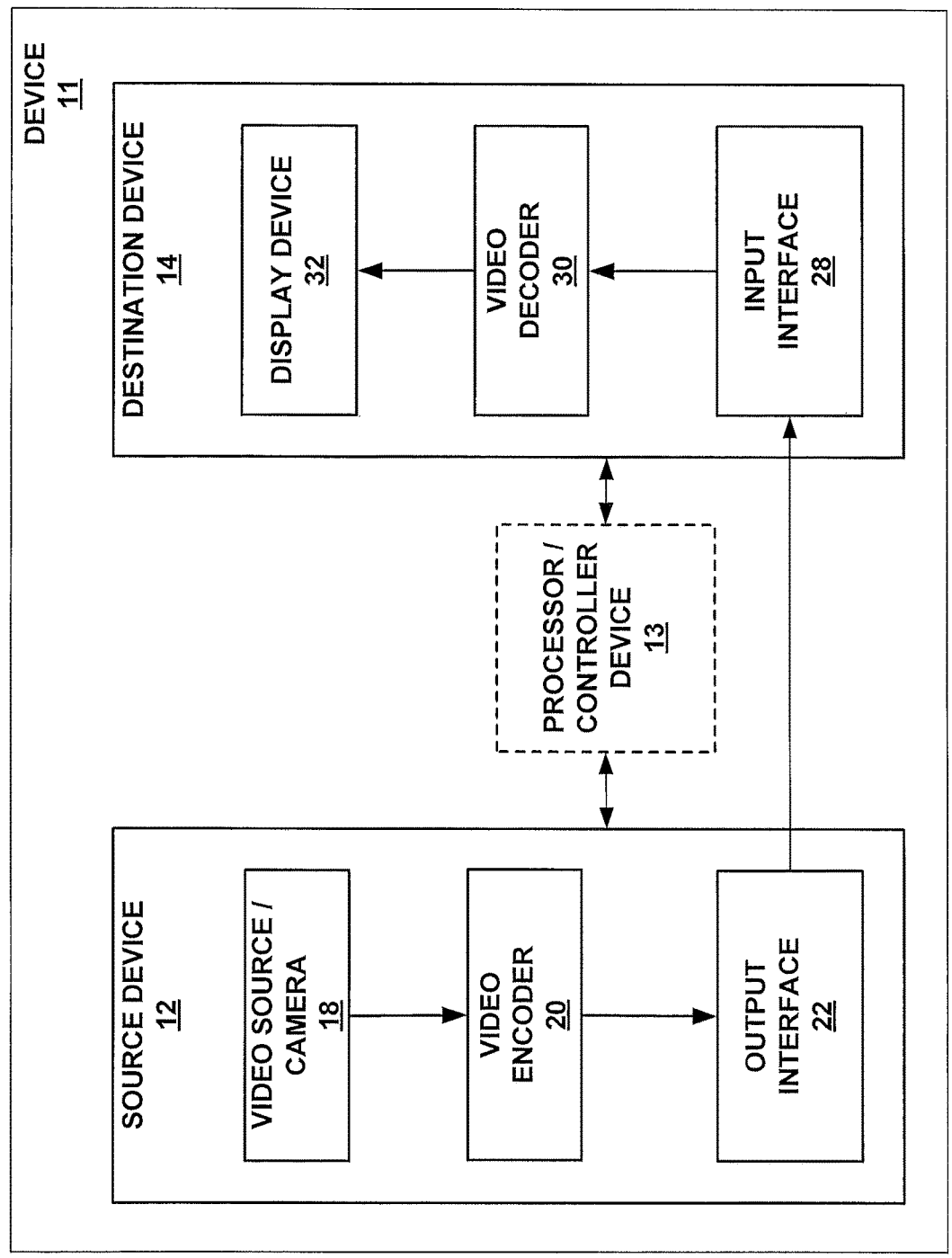
FIG. 1B is a block diagram illustrating another example video encoding and decoding system that may perform techniques in accordance with aspects described in this disclosure.

As shown in FIG. 1A, video coding system 10 includes a source device 12 (i.e., "video coding device 12" or "coding device 12") that generates encoded video data to be decoded at a later time by a destination device 14 (i.e., "video coding device 14" or "coding device 14"). In the example of FIG. 1A, the source device 12 and destination device 14 constitute separate devices. It is noted, however, that the source device 12 and destination device 14 may be on or part of the same device, as shown in the example of FIG. 1B.

With reference once again, to FIG. 1A, the source device 12 and the destination device 14 may respectively comprise any of a wide range of devices (also referred to as video coding devices) including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In various embodiments, the source device 12 and the destination device 14 may be equipped for (i.e., configured to communicate via) wireless communication.

The video coding devices 12, 14 of the video coding system 10 may be configured to communicate via wireless networks and radio technologies, such as wireless wide area network (WWAN) (e.g., cellular) and/or wireless local area network (WLAN) carriers. The terms "network" and "system" are often used interchangeably. Each of the video coding devices 12, 14 may be a user equipment (UE), a wireless device, a terminal, a mobile station, a subscriber unit, etc.

The WWAN carriers may include, for example, wireless communication networks such as Code Division Multiple Access (CDMA), Time Division Multiple Access (TDMA), Frequency Division Multiple Access (FDMA), Orthogonal FDMA (OFDMA), Single-Carrier FDMA (SC-FDMA) and other networks. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2).

The video coding devices 12, 14 of the video coding system 10 may also communicate with each over via a WLAN base station according to one or more standards, such as the IEEE 802.11 standard, including, for example these amendments: 802.11a-1999 (commonly called "802.11a"), 802.11b-1999 (commonly called "802.11b"), 802.11g-2003 (commonly called "802.11g"), and so on.

The destination device 14 may receive, via link 16, the encoded video data to be decoded. The link 16 may comprise any type of medium or device capable of moving the encoded video data from the source device 12 to the destination device 14. In the example of FIG. 1A, the link 16 may comprise a communication medium to enable the source device 12 to transmit encoded video data to the destination device 14 in real-time. The encoded video data may be modulated according to a communication standard, such as a wireless communication protocol, and transmitted to the destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In the example of FIG. 1A, the source device 12 includes a video source 18, video encoder 20 and the output interface 22. In some cases, the output interface 22 may include a modulator/demodulator (modem) and/or a transmitter. In the source device 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called "camera phones" or "video phones", as illustrated in the example of FIG. 1B. However, the techniques described in this disclosure may be applicable to video coding in general, and may be applied to wireless and/or wired applications.

The captured, pre-captured, or computer-generated video may be encoded by the video encoder 20. The encoded video data may be transmitted to the destination device 14 via the output interface 22 of the source device 12. The encoded video data may also (or alternatively) be stored onto a storage device (not illustrated) for later access by the destination device 14 or other devices, for decoding and/or playback. The video encoder 20 illustrated in FIGS. 1A and 1B may comprise the video encoder 20 illustrated FIG. 2A or any other video encoder described herein.

In the example of FIG. 1A, the destination device 14 includes the input interface 28, a video decoder 30, and a display device 32. In some cases, the input interface 28 may include a receiver and/or a modem. The input interface 28 of the destination device 14 may receive the encoded video data over the link 16 and/or from the storage device. The encoded video data communicated over the link 16, or provided on the storage device, may include a variety of syntax elements generated by the video encoder 20 for use by a video decoder, such as the video decoder 30, in decoding the video data. Such syntax elements may be included with the encoded video data transmitted on a communication medium, stored on a storage medium, or stored a file server. The video decoder 30 illustrated in FIGS. 1A and 1B may comprise the video decoder 30 illustrated in FIG. 2B or any other video decoder described herein.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In related aspects, FIG. 1B shows an example video coding system 10' wherein the source device 12 and the destination device 14 are on or part of a device 11. The device 11 may be a telephone handset, such as a "smart" phone or the like. The device 11 may include a processor/controller device 13 (optionally present) in operative communication with the source device 12 and the destination device 14. The video coding system 10' of FIG. 1B, and components thereof, are otherwise similar to the video coding system 10 of FIG. 1A, and components thereof.

Although each of FIGS. 1A and 1B show that the source device 12 includes the video source/camera 18, the video encoder 20, and the output interface 22 and the destination device 14 includes the input interface 28, the video decoder 30, and the display device 32, each of the source and destination devices 12 and 14 may include additional elements. For example, each of the source and destination devices 12 and 14 may have a similar structure including the video source/camera 18, the video encoder 20, the output interface 22, the input interface 28, the video decoder 30, and the display device 32. As such, in certain implementations the source and destination devices 12 and 14 may be interchangeable.

The video encoder 20 and the video decoder 30 may operate according to a video compression standard, such as DSC. Alternatively, the video encoder 20 and the video decoder 30 may operate according to other proprietary or industry standards, such as the ITU-T H.264 standard, alternatively referred to as MPEG-4, Part 10, AVC, HEVC or extensions of such standards. The techniques of this disclosure, however, are not limited to any particular coding standard. Other examples of video compression standards include MPEG-2 and ITU-T H.263.

Although not shown in the examples of FIGS. 1A and 1B, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder in a respective device.

Video Coding Process

As mentioned briefly above, the video encoder 20 encodes video data. The video data may comprise one or more pictures. Each of the pictures is a still image forming part of a video. In some instances, a picture may be referred to as a video "frame." When the video encoder 20 encodes the video data (e.g., video coding layer (VCL) data and/or non-VCL data), the video encoder 20 may generate a bitstream. The bitstream may include a sequence of bits that form a coded representation of the video data. The bitstream may include coded pictures and associated data. A coded picture is a coded representation of a picture. VCL data may include coded picture data (i.e., information associated with samples of a coded picture(s)) and non-VCL data may include control information (e.g., parameter sets and/or supplemental enhancement information) associated with the one or more coded pictures To generate the bitstream, the video encoder 20 may perform encoding operations on each picture in the video data. When the video encoder 20 performs encoding operations on the pictures, the video encoder 20 may generate a series of coded pictures and associated data. The associated data may include a set of coding parameters such as a quantization parameter (QP). To generate a coded picture, the video encoder 20 may partition a picture into equally-sized video blocks. A video block may be a two-dimensional array of samples. The coding parameters may define a coding option (e.g., a coding mode) for every block of the video data. The coding option may be selected in order to achieve a desired rate-distortion performance.

In some examples, the video encoder 20 may partition a picture into a plurality of slices. Each of the slices may include a spatially distinct region in an image (e.g., a frame) that can be decoded independently without information from the rest of the regions in the image or frame. Each image or video frame may be encoded in a single slice or each image or video frame may be encoded in several slices. In DSC, the number of bits allocated to encode each slice may be substantially constant. As part of performing an encoding operation on a picture, the video encoder 20 may perform encoding operations on each slice of the picture. When the video encoder 20 performs an encoding operation on a slice, the video encoder 20 may generate encoded data associated with the slice. The encoded data associated with the slice may be referred to as a "coded slice."

DSC Video Encoder

Figure 2A:
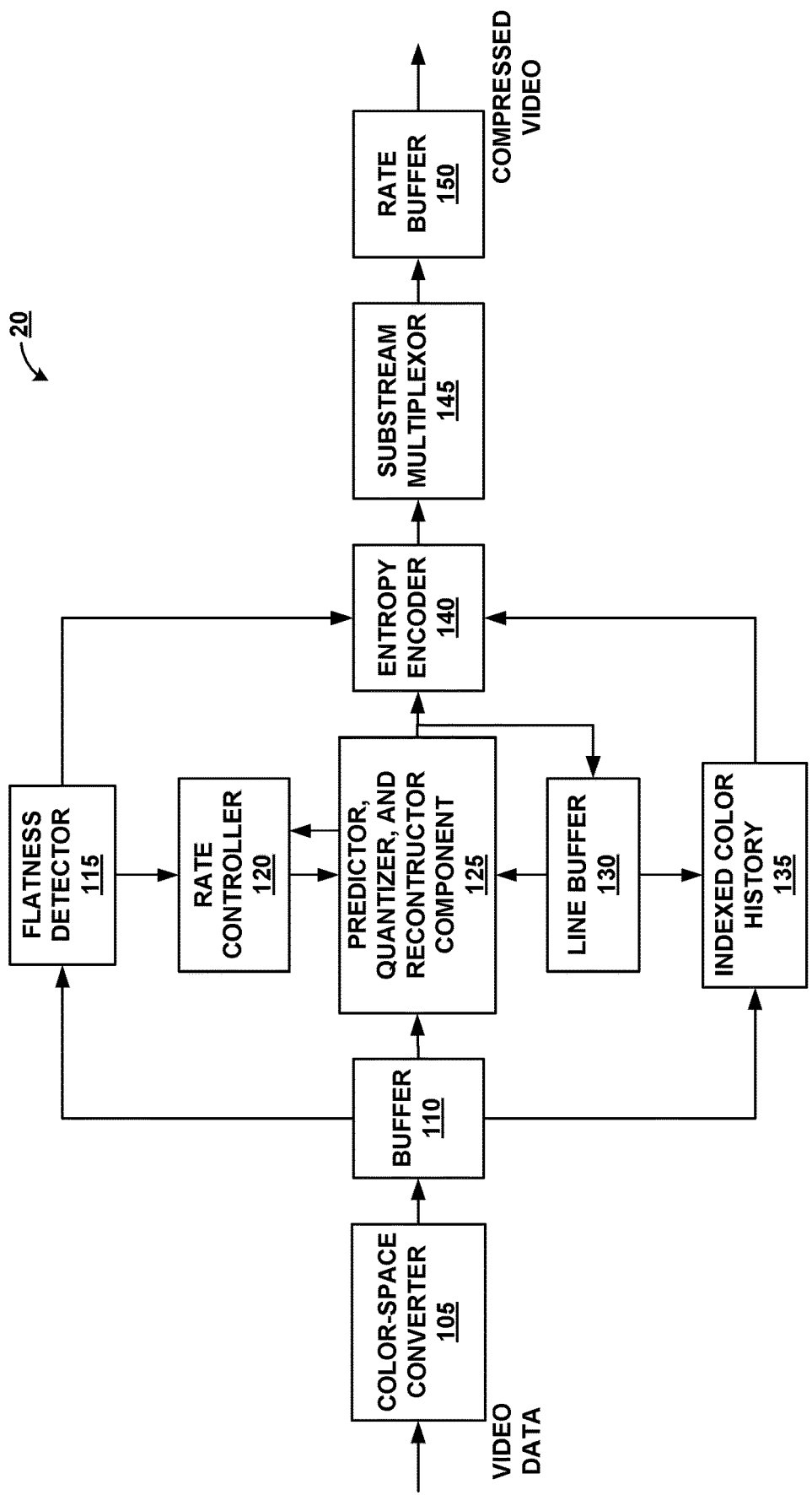
FIG. 2A is a block diagram illustrating an example of a video encoder that may implement techniques in accordance with aspects described in this disclosure.

FIG. 2A is a block diagram illustrating an example of the video encoder 20 that may implement techniques in accordance with aspects described in this disclosure. The video encoder 20 may be configured to perform some or all of the techniques of this disclosure. In some examples, the techniques described in this disclosure may be shared among the various components of the video encoder 20. In some examples, additionally or alternatively, a processor (not shown) may be configured to perform some or all of the techniques described in this disclosure.

For purposes of explanation, this disclosure describes the video encoder 20 in the context of DSC coding. However, the techniques of this disclosure may be applicable to other coding standards or methods.

In the example of FIG. 2A, the video encoder 20 includes a plurality of functional components. The functional components of the video encoder 20 include a color-space converter 105, a buffer, 110, a flatness detector 115, a rate controller 120, a predictor, quantizer, and reconstructor component 125, a line buffer 130, an indexed color history 135, an entropy encoder 140, a substream multiplexor 145, and a rate buffer 150. In other examples, the video encoder 20 may include more, fewer, or different functional components.

The color-space 105 converter may convert an input color-space to the color-space used in the coding implementation. For example, in one exemplary embodiment, the color-space of the input video data is in the red, green, and blue (RGB) color-space and the coding is implemented in the luminance Y, chrominance green Cg, and chrominance orange Co (YCgCo) color-space. The color-space conversion may be performed by method(s) including shifts and additions to the video data. It is noted that input video data in other color-spaces may be processed and conversions to other color-spaces may also be performed.

In related aspects, the video encoder 20 may include the buffer 110, the line buffer 130, and/or the rate buffer 150. For example, the buffer 110 may hold the color-space converted video data prior to its use by other portions of the video encoder 20. In another example, the video data may be stored in the RGB color-space and color-space conversion may be performed as needed, since the color-space converted data may require more bits.

The rate buffer 150 may function as part of the rate control mechanism in the video encoder 20, which will be described in greater detail below in connection with rate controller 120. The bits spent on encoding (i.e., the bits utilized to encode) each block of video data can vary highly substantially based on the properties (e.g., size, number of bits, etc.) of the block. The rate buffer 150 can smooth the rate variations in the compressed video (i.e., the output video stream). In some embodiments, a constant bit rate (CBR) buffer model is employed in which bits are removed from the buffer at a constant bit rate during transmission of data over a wired physical link. In the CBR buffer model, if the video encoder 20 adds too many bits to the bitstream, the number of bits in the rate buffer 150 may exceed the capacity of the rate buffer 150, causing overflow. On the other hand, the video encoder 20 should add bits at a sufficient rate in order to prevent underflow of the rate buffer 150.

On the video decoder side, the bits may be added to rate buffer 155 of the video decoder 30 (see FIG. 2B which is described in further detail below) at a constant bit rate, and the video decoder 30 may remove variable numbers of bits for each block. To ensure proper decoding, the rate buffer 155 of the video decoder 30 should not underflow or overflow during the decoding of the compressed bit stream.

In some embodiments, the buffer fullness (BF) can be defined based on a variable BufferCurrentSize representing the number of bits currently stored in the buffer and a variable BufferMaxSize representing a size (i.e., a capacity) of the rate buffer 150, i.e., the overall maximum number of bits that can be stored in the rate buffer 150. The "fullness" of the buffer (also referred to as buffer fullness (BF)) may be calculated as shown in Equation 1 below. BF represents a percentage of the capacity of a buffer being used for storage of bits at a particular point in time.

$$BF=((BufferCurrentSize*100)/BufferMaxSize) \quad \text{(Equation 1)}$$

The flatness detector 115 can detect changes from complex (i.e., non-flat) areas in the video data to flat (i.e., simple or uniform) areas in the video data. The terms "complex" and "flat" will be used herein to generally refer to the difficulty for the video encoder 20 to encode the respective regions of the video data. Thus, the term complex as used herein generally describes a region of the video data as being complex for the video encoder 20 to encode and may, for example, include textured video data, high spatial frequency, and/or other features which are complex to encode. The term flat as used herein generally describes a region of the video data as being simple for the video encoder 20 to encoder and may, for example, include a smooth gradient in the video data, low spatial frequency, and/or other features which are simple to encode. The transitions between complex and flat regions may be used by the video encoder 20 to reduce quantization artifacts in the encoded video data. Specifically, the rate controller 120 and the predictor, quantizer, and reconstructor component 125 can reduce such quantization artifacts when the transitions from complex to flat regions are identified.

The rate controller 120 determines a set of coding parameters, e.g., a QP. The QP may be adjusted by the rate controller 120 based on the buffer fullness of the rate buffer 150 and image activity of the video data in order to maximize picture quality for a target bitrate which ensures that the rate buffer 150 does not overflow or underflow. The rate controller 120 also selects a particular coding option (e.g., a particular mode) for each block of the video data in order to achieve the optimal rate-distortion performance. The rate controller 120 minimizes the distortion of the reconstructed images such that the rate controller 120 satisfies the bit-rate constraint, i.e., the overall actual coding rate falls within the target bit rate.

The predictor, quantizer, and reconstructor component 125 may perform at least three encoding operations of the video encoder 20. The predictor, quantizer, and reconstructor component 125 may perform prediction in a number of different modes. One example prediction mode is a modified version of median-adaptive prediction. Median-adaptive prediction may be implemented by the lossless JPEG standard (JPEG-LS). The modified version of median-adaptive prediction which may be performed by the predictor, quantizer, and reconstructor component 125 may allow for parallel prediction of three consecutive sample values. Another example prediction mode is block prediction. In block prediction, samples are predicted from previously reconstructed pixels in the line above or to the left in the same line. In some embodiments, the video encoder 20 and the video decoder 30 may both perform an identical search on reconstructed pixels to determine the block prediction usages, and thus, no bits need to be sent in the block prediction mode. In other embodiments, the video encoder 20 may perform the search and signal block prediction vectors in the bitstream, such that the video decoder 30 need not perform a separate search. A midpoint prediction mode may also be implemented in which samples are predicted using the midpoint of the component range. The midpoint prediction mode may enable bounding of the number of bits required for the compressed video in even the worst-case sample.

The predictor, quantizer, and reconstructor component 125 also performs quantization. For example, quantization may be performed via a power-of-2 quantizer which may be implemented using a shifter. It is noted that other quantization techniques may be implemented in lieu of the power-of-2 quantizer. The quantization performed by the predictor, quantizer, and reconstructor component 125 may be based on the QP determined by the rate controller 120. Finally, the predictor, quantizer, and reconstructor component 125 also performs reconstruction which includes adding the inverse quantized residual to the predicted value and ensuring that the result does not fall outside of the valid range of sample values.

It is noted that the above-described example approaches to prediction, quantization, and reconstruction performed by the predictor, quantizer, and reconstructor component 125 are merely illustrative and that other approaches may be implemented. It is also noted that the predictor, quantizer, and reconstructor component 125 may include subcomponent(s) for performing the prediction, the quantization, and/or the reconstruction. It is further noted that the prediction, the quantization, and/or the reconstruction may be performed by several separate encoder components in lieu of the predictor, quantizer, and reconstructor component 125.

The line buffer 130 holds the output from the predictor, quantizer, and reconstructor component 125 so that the predictor, quantizer, and reconstructor component 125 and the indexed color history 135 can use the buffered video data. The indexed color history 135 stores recently used pixel values. These recently used pixel values can be referenced directly by the video encoder 20 via a dedicated syntax.

The entropy encoder 140 encodes the prediction residuals and any other data (e.g., indices identified by the predictor, quantizer, and reconstructor component 125) received from the predictor, quantizer, and reconstructor component 125 based on the indexed color history 135 and the flatness transitions identified by the flatness detector 115. In some examples, the entropy encoder 140 may encode three samples per clock per substream encoder. The substream multiplexor 145 may multiplex the bitstream based on a headerless packet multiplexing scheme. This allows the video decoder 30 to run three entropy decoders in parallel, facilitating the decoding of three pixels per clock. The substream multiplexor 145 may optimize the packet order so that the packets can be efficiently decoded by the video decoder 30. It is noted that different approaches to entropy coding may be implemented, which may facilitate the decoding of power-of-2 pixels per clock (e.g., 2 pixels/clock or 4 pixels/clock).

DSC Video Decoder

Figure 2B:
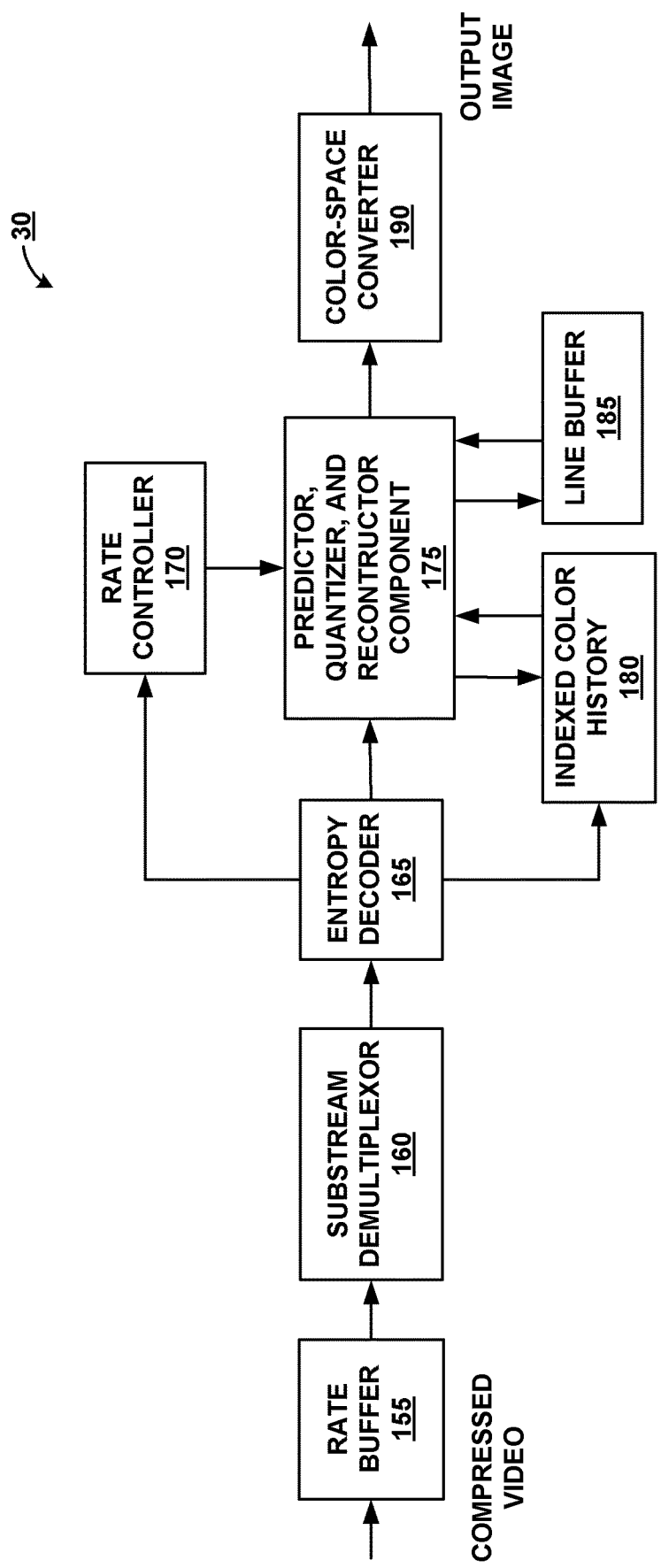
FIG. 2B is a block diagram illustrating an example of a video decoder that may implement techniques in accordance with aspects described in this disclosure.

FIG. 2B is a block diagram illustrating an example of the video decoder 30 that may implement techniques in accordance with aspects described in this disclosure. The video decoder 30 may be configured to perform some or all of the techniques of this disclosure. In some examples, the techniques described in this disclosure may be shared among the various components of the video decoder 30. In some examples, additionally or alternatively, a processor (not shown) may be configured to perform some or all of the techniques described in this disclosure.

For purposes of explanation, this disclosure describes the video decoder 30 in the context of DSC coding. However, the techniques of this disclosure may be applicable to other coding standards or methods.

In the example of FIG. 2B, the video decoder 30 includes a plurality of functional components. The functional components of the video decoder 30 include a rate buffer 155, a substream demultiplexor 160, an entropy decoder 165, a rate controller 170, a predictor, quantizer, and reconstructor component 175, an indexed color history 180, a line buffer 185, and a color-space converter 190. The illustrated components of the video decoder 30 are analogous to the corresponding components described above in connection with the video encoder 20 in FIG. 2A. As such, each of the components of the video decoder 30 may operate in a similar fashion to the corresponding components of the video encoder 20 as described above.

Slices in DSC

As noted above, a slice generally refers to a spatially distinct region in an image or a frame that can be decoded independently without using the information from the rest of the regions in the image or frame. Each image or video frame may be encoded in a single slice or each image or video frame may be encoded in several slices. In DSC, the number of bits allocated to encode each slice may be substantially constant.

According to aspects of the present disclosure, coding of images may be block-based and include numerous coding modes, each aimed at compressing different types of content. Mode selection may be handled by a rate-control feature (i.e., the rate controller 120 or the rate controller 170) aimed at selecting an appropriate mode for each block by considering both the rate and the distortion of the modes. The rate-control feature may be supported by an hypothetical reference decoder (HRD) buffer model (i.e., the rate buffer 150 or the rate buffer 155). In one example, the HRD buffer is never in a state of underflow (e.g., fewer than zero bits in the buffer) or overflow (e.g., the buffer size has increased past a set maximum size).

For a slice-based video codec, there are challenges with compressing content in the first line of a slice, relative to non-first lines (i.e., lines other than the first line) of the slice. This is because non-first lines can exploit highly-correlated predictors in the reconstructed lines above the non-first lines of the slice, whereas first lines cannot due to the fact that reconstructed lines of a slice above a first line of the given slice are unavailable. Accordingly, a coding mode which exploits horizontal predictors may be desirable for blocks in the first line of the slice. This mode may be a variant of the larger set of Delta Pulse Code Modulation (DPCM) modes and may be tuned to be implemented efficiently in hardware. In addition, a variant may be described which does not use any predictors whatsoever for a first set of pixels in the block of the first line of a given slice. The trade-off between the two techniques is hardware complexity/throughput vs. compression rate/performance.

Spatial Prediction

To overcome the above-described challenges with existing approaches for coding techniques such as DSC, this disclosure describes improvements below. In this disclosure, the following described techniques and approaches may be used solely or in any combination.

In accordance with one or more aspects of the present disclosure, there is provided a spatial prediction mode/technique for the coding of video data, which may be, for example, graphics content. In related aspects, hardware complexity may be minimized while maintaining a high level of performance.

Figure 3:
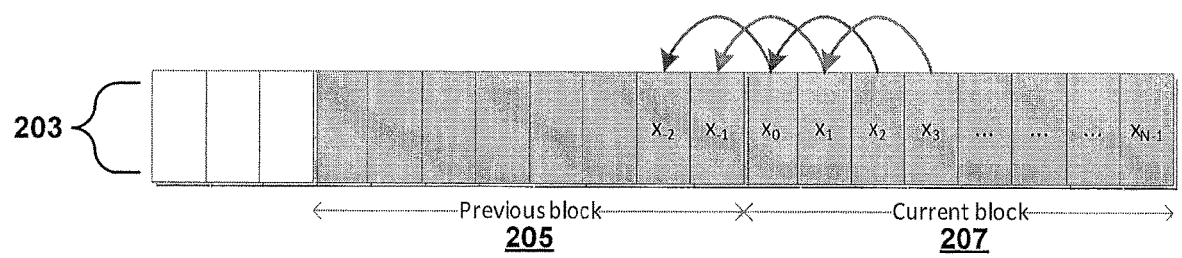
FIG. 3 is a block diagram illustrating a method of coding a first line of a slice in accordance with aspects described in this disclosure.
Figure 4:
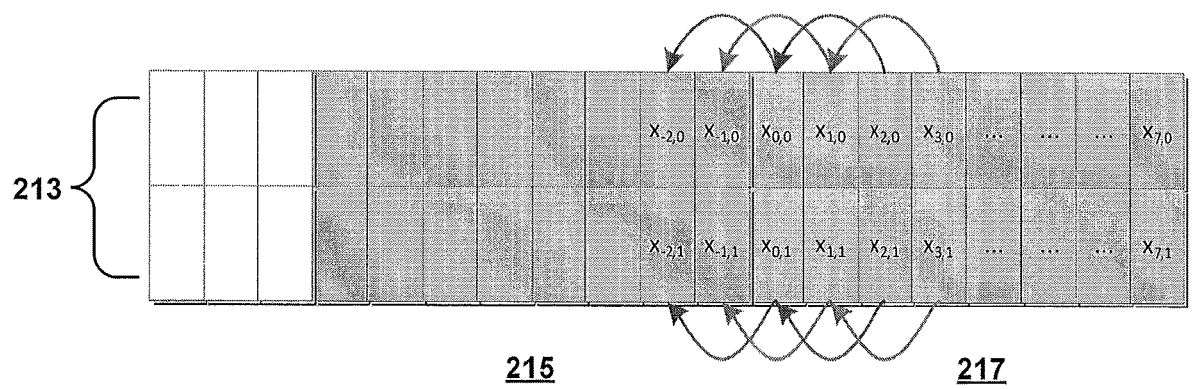
FIG. 4 is a block diagram illustrating another method of coding a first line of a slice in accordance with aspects described in this disclosure.

FIG. 3 is a block diagram illustrating a method of coding a first line of a slice in accordance with aspects described in this disclosure. FIG. 4 is a block diagram illustrating another method of coding a first line of a slice in accordance with aspects described in this disclosure. FIG. 3 illustrates a portion of a slice which includes a first line 203 including a previous block 205 and a current block 207. The previous block 205 includes a plurality of pixels include pixels $X_{-2}$ and $X_{-1}$. The current block 207 includes a plurality of pixels $X_0$ through $X_{N-1}$, where each of the blocks includes N pixels. FIG. 4 illustrates a portion of a slice which includes a first line 213 including a previous block 215 and a current block 217. In the FIG. 4 implementation, the blocks 215 and 217 are 2-dimensional (2D) blocks.

A current pixel $X_0$ of the current block 207 may be predicted based on the second-left neighbor pixel, i.e., pixel $X_{-2}$ of the previous block 205. This may be generalized to any pixel of the first line 203, for example, a current pixel $X_i$ can be predicted from a previous pixel $X_{i-2}$, that is the second-left neighbor to the current pixel $X_i$. It is noted that prediction of the current pixel $X_i$ from the second-left neighbor allows two coding paths to be executed in parallel (one path on even pixels and another path on odd pixels). This dramatically reduces the critical path in a hardware implementation. This method of prediction is denoted as "interleaved prediction" herein.

It is further noted that, to reduce dependency on previous reconstructed blocks, one or more pixels at the beginning of the block may be encoded using Pulse Code Modulation (PCM) (without prediction).

The techniques disclosed herein may be used for any block-based codec regardless of whether the block size is 1-dimensional (1D) or 2D and may be further applicable to higher dimensional blocks (e.g., 3D blocks). The techniques disclosed herein may also be used in conjunction with any type of DPCM methodology. For example, the disclosed techniques may be used with a standard DPCM scheme or a Median Adaptive Predictor (MAP) scheme.

1D Spatial Prediction

Example prediction paths for spatial prediction mode are illustrated in FIGS. 3 and 4. As previously described, each pixel in the current block 207 or 217 may be predicted from its second-left neighbor pixel. In some implementations, when the previous neighbor is outside of the current slice, a default predictor may be used, which may, for example, be equal to half the current pixel's (i.e., the pixel currently being coded) dynamic range. The dynamic range of each of the pixels in a given video frame may be common for the entire video frame. In this example, for RGB content having 8 bits/component (RGB888 content), the default value will be 128 for R, G and B. For YCoCg content having 8 bits for Y, 9 for Co/Cg, the predictors will have a default value of 128 for Y and a default value of 0 for Co and Cg. These values may be scaled accordingly for higher bit-depth source content. For example, if the source is RGB10/10/10, then a default value of 512 may be used for R/G/B. The prediction loop may be computed as follows:

$p(x_0) = x_{-2}$ $a_0 = Q(x_0 - p(x_0))$ $\hat{x}_0 = p(x_0) + Q^{-1}(a_0)$

Here, the quantized spatial residual coefficients are given by $a_i$; quantization and de-quantization are given by $Q(\cdot)$ and $Q^{-1}(\cdot)$, respectively; the reconstructed pixel for $x_i$ is denoted as $\hat{x}_i$; and prediction is given by $p(\cdot)$. As illustrated in FIGS. 3 and 4, the pixels $x_{-2}$ and $x_{-1}$ are from the previous reconstructed block 205 or 215. The prediction proceeds for the following two pixels as follows:

$p(x_1) = x_{-1}$ $a_1 = Q(x_1 - p(x_1))$ $\hat{x}_1 = p(x_1) + Q^{-1}(a_1)$ $p(x_2) = \hat{x}_0$ $a_2 = Q(x_2 - p(x_2))$ $\hat{x}_2 = p(x_2) + Q^{-1}(Q_2)$ A similar approach may be used for the remaining pixels in the current block.

If the current block includes multiple lines (e.g. a 2×8 block size is employed) as in the implementation of FIG. 4, then the parallelism can be further increased. Interleaved prediction allows for 2 parallel coding paths per line or row of each block 215 and 217, and multiple lines of the blocks 215 and 217 may also be processed independently. Therefore, for the 2×8 block size, a total of four coding parallel paths may be exploited. Although the above has described each of the 2×8 blocks 215 and 217 as including two lines, the term "first line" as used herein generally refers to the first independently coded line of blocks in the slice. Thus, the first line of the slice illustrated in FIG. 4 may include all of the pixels in blocks 215 and 217 even though these blocks 215 and 217 are 2D. For example, the samples $x_{0,0}$, $x_{1,0}$, $x_{0,1}$, $x_{1,1}$ in FIG. 4 may be predicted/quantized/reconstructed in parallel:

$P(x_{0,0}) = x_{-2,0}$ $P(x_{1,0}) = x_{-1,0}$ $P(x_{0,1}) = x_{-2,1}$

MAP Spatial Prediction

Figure 5:
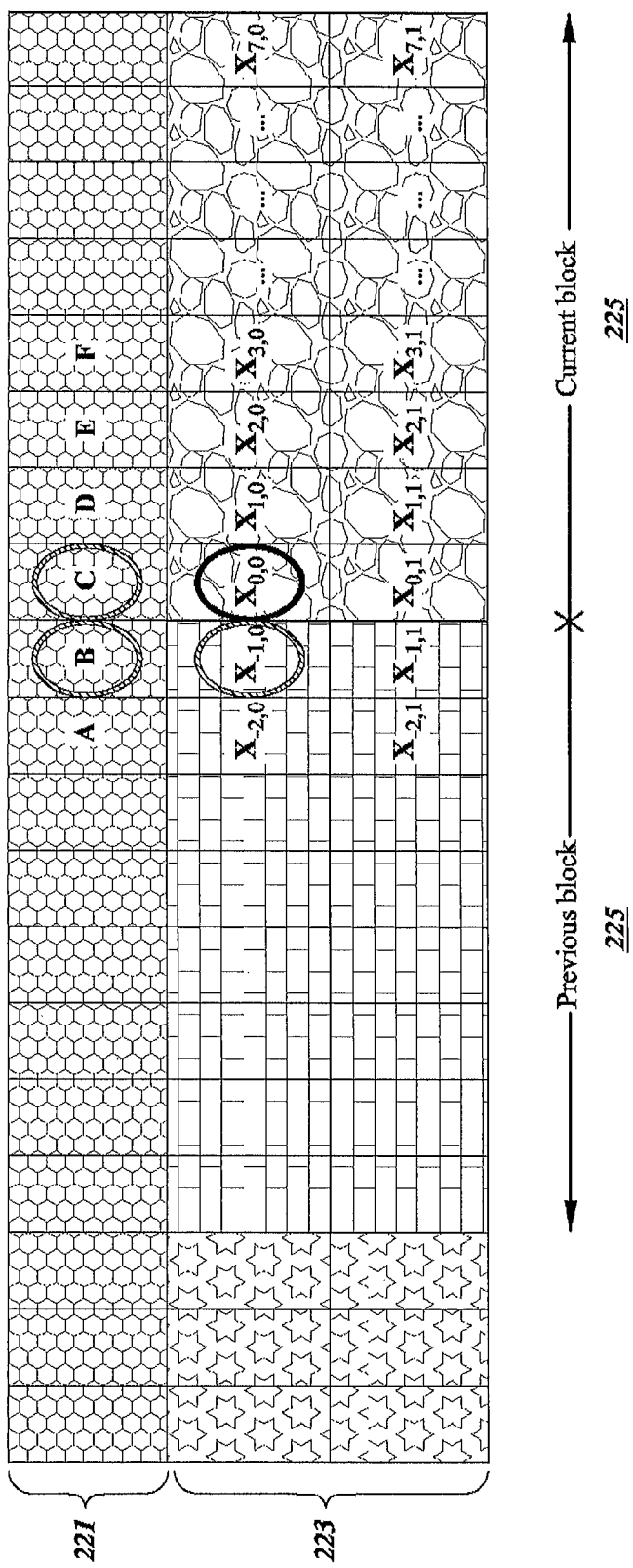
FIG. 5 is a block diagram illustrating the spatial relationships between a current pixel and predictor pixels in a method of coding a block in accordance with aspects described in this disclosure.
Figure 6:
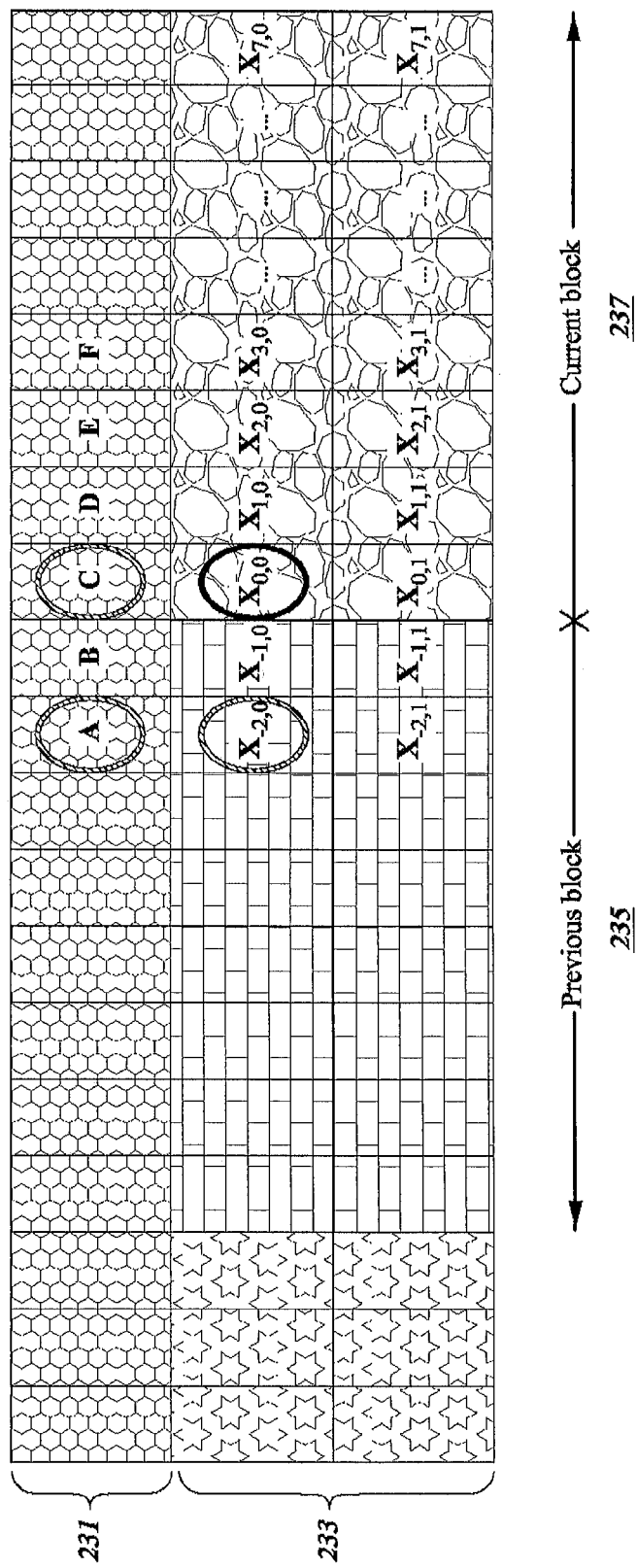
FIG. 6 is a block diagram illustrating the spatial relationships between a current pixel and predictor pixels in a method of coding a block in accordance with aspects described in this disclosure.
Figure 7:
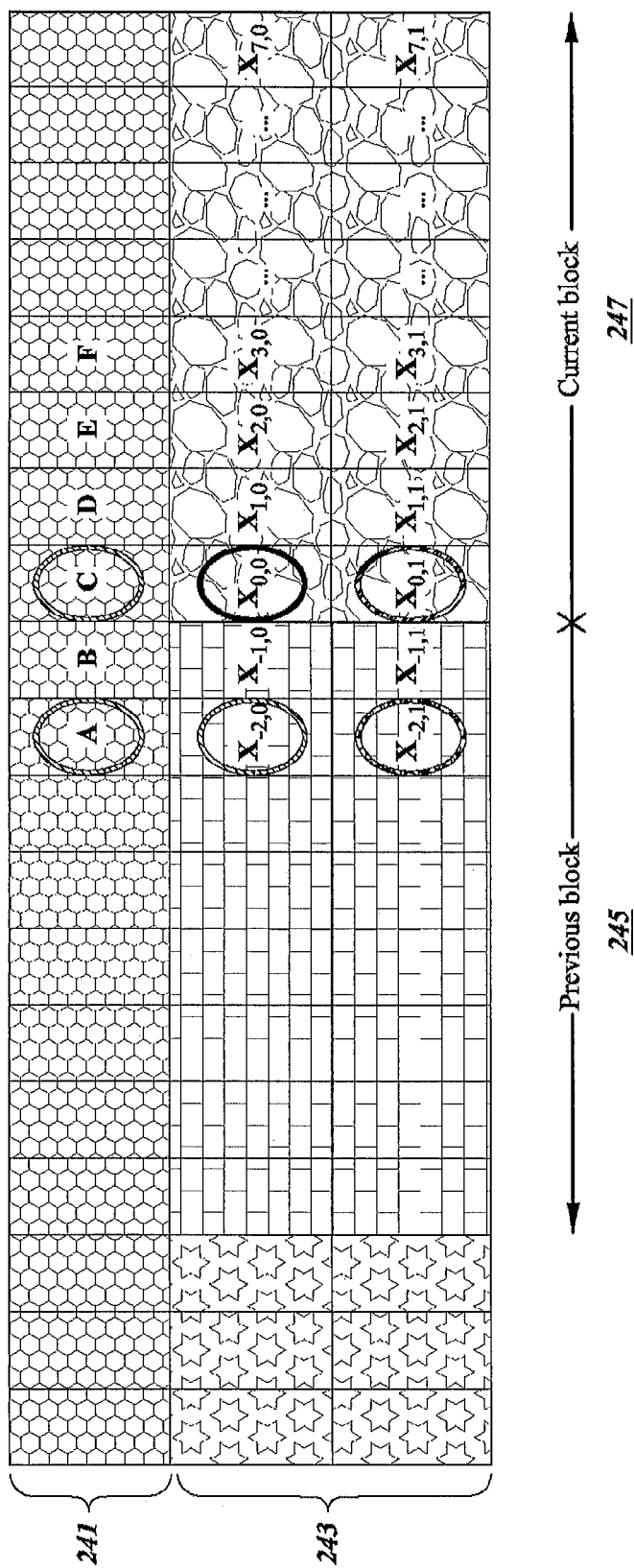
FIG. 7 is a block diagram illustrating the spatial relationships between a current pixel and predictor pixels in a method of coding block in accordance with aspects described in this disclosure.

FIGS. 5-7 are block diagrams illustrating the spatial relationships between a current pixel and predictor pixels in a number of methods of coding a block in accordance with aspects described in this disclosure. In particular, FIGS. 5-7 illustrate prediction paths for 2D MAP spatial prediction. In FIGS. 5-7, the illustrated pixels include a previous line 221, 231, or 241, a current line 223, 233, or 243, a previous block 225, 235, or 245 of the current line 223, 233, or 243 and a current block 227, 237, or 247 of the current line 223, 233, or 243. The previous line 221, 231, or 241 includes pixels A through F, the previous block, 225, 235, or 245 includes pixels $X_{-2,0}$, $X_{-1,0}$, $X_{-2,1}$, and $X_{-1,1}$. In FIGS. 5-7, similar reference numerals have been used to illustrate similar layouts of the illustrated blocks and/or pixels.

FIG. 5 illustrates a set of predictor pixels that may be used in a full MAP implementation. The illustrated predictor pixels B, C, and $X_{-1,0}$ are the closest spatial neighbors to the current pixel $X_{0,0}$, and thus, may have the highest likelihood of being closely correlated with the current pixel $X_{0,0}$. FIG. 5 has the lowest throughput of the illustrated implementations, with one encoding path for all pixels within the block. Two parallel approaches, i.e., set of predictor pixels that may be used for DPCM, are illustrated in FIGS. 6 and 7, which increase the throughput of the FIG. 5 implementation by 2× and 4×, respectively. For example, the set of predictor pixels for FIG. 6 may be selected to allow two coding paths to be executed in parallel since there may be no overlapping dependencies between the two coding paths. Similarly, FIG. 7 illustrates an implementation in which four coding paths may be executed in parallel. For example, the in implementation of FIG. 7, two parallel paths per row may be independently processes where each of the paths includes no overlapping dependencies. This is beneficial to hardware, as the worst case critical path will be reduced, decreasing the complexity of the hardware implementation.

The prediction loop for the FIG. 5 implementation may be computed as follows:

$pA = \widehat{x}_{-1,0}$ $pB=C, pC=B$ $p(x_{0,0})=MED(pA,pB,pA+pB-pC)$ $a_{0,0}=Q(x_{0,0}-p(x_{0,0}))$ $\widehat{x}_{0,0} = p(x_{0,0}) + Q^{-1}(a_{0,0})$ Here, the quantized spatial residual coefficients are given by $a_{zj}$; quantization and de-quantization are given by $Q(\cdot)$ and $Q^{-1}(\cdot)$, respectively; the reconstructed pixel for $x_{ij}$ is denoted as $\widehat{x}_{i,j}$; and prediction is given by $p(\cdot)$. As illustrated in FIG. 5, the pixels $x_{-1}$ is from the previous reconstructed block 225 and the pixels B and C are from the previous line 221. Further, $MED(\cdot)$ is a median function which returns the median the inputs to the function.

The prediction loop for the implementation of FIG. 6 may be computed as follows, where the functions and values are defined above:

$pA = \widehat{x}_{-2,0}$ $pB=C, pC=A$ $p(x_{0,0})=MED(pA,pB,pA+pB-pC)$ $a_{0,0}=Q(x_{0,0}-p(x_{0,0}))$ $\widehat{x}_{0,0} = p(x_{0,0}) + Q^{-1}(a_{0,0})$ Similarly, the prediction loop for the implementation of FIG. 7 may be computed as follows, where the functions and values are defined above:

$pA = \widehat{x}_{-2,0}, pB=C, pC=B$ $pA = \widehat{x}_{-2,1}, pB=C, pC=A$ $p(x_{0,0})=MED(pA,pB,pA+pB-pC)$ $p(x_{0,1})=MED(pA,pB,pA+pB-pC)$ $a_{0,0}=Q(x_{0,0}-p(x_{0,0}))$ $a_{0,1}=Q(x_{0,1}-p(x_{0,1}))$ $\widehat{x}_{0,0} = p(x_{0,0}) + Q^{-1}(a_{0,0})$ $\widehat{x}_{0,1} = p(x_{0,1}) + Q^{-1}(a_{0,1})$ The choice of quantizer may depend on the design criteria of the codec at-large. However, any suitable quantizer may be employed. For example, a simple quantizer may be used as follows for a low cost hardware design:

```
Quantize(value, bits):
    if (value == 0 || bits == 0)
        return value;
    Int sign = (value > 0 ? +1 : -1);
    Int key = abs(value);
    Int round = (1 << (bits - 1));
    return (sign * ((key + round) >> bits));
```

```
DeQuantize(value, bits):
    if (value == 0 || bits == 0)
        return value;
```

```
DeQuantize(value, bits):
    Int sign = (value > 0 ? +1 : -1);
    Int key = abs(value);
    return (sign * (key << bits));
```

Once the quantized residuals $a_i$ are computed for the entire block, the quantized residuals $a_i$ may be entropy-coded before being transmitted to the decoder.

Figure 8:
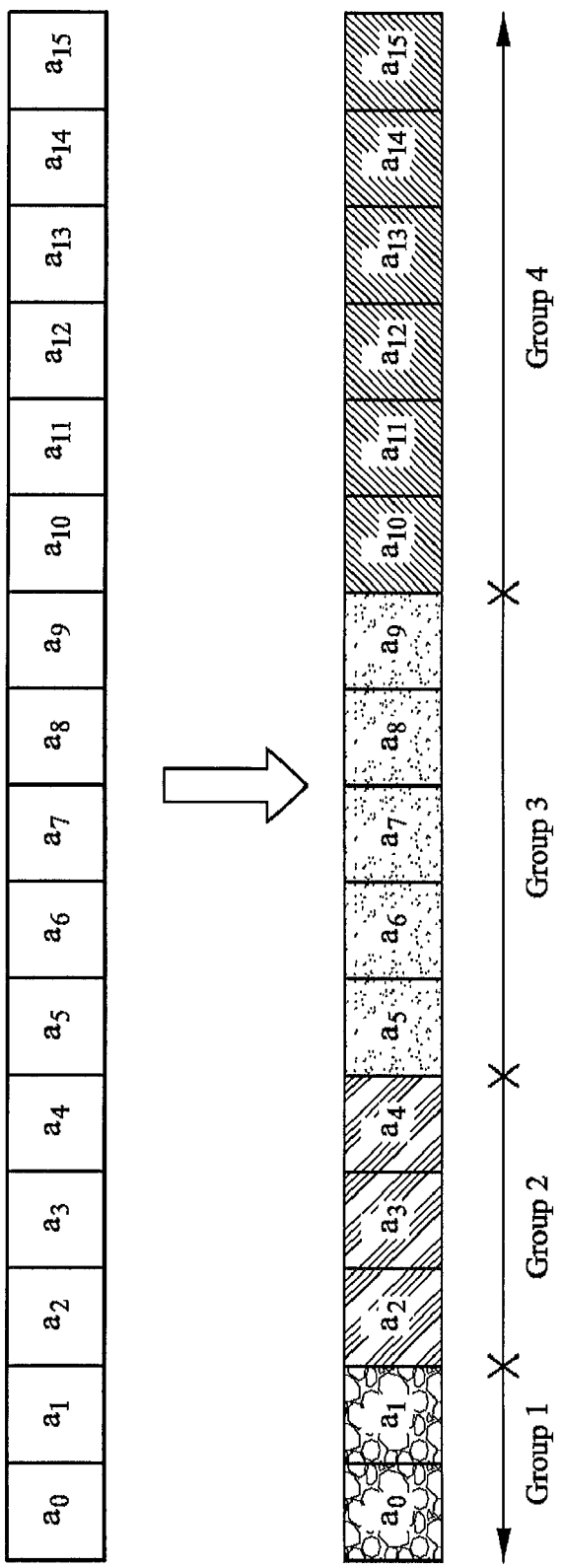
FIG. 8 is a block diagram illustrating an example grouping strategy in accordance with aspects described in this disclosure.

FIG. 8 is a block diagram illustrating an example grouping strategy in accordance with aspects described in this disclosure. It is noted that, depending on the type of entropy coder used, the grouping strategy for quantized coefficients may either be uniform or adhere to a grouping strategy shown in FIG. 8. FIG. 8 includes a plurality of quantized residuals $a_0$ through $a_{15}$ which are grouped into a plurality of groups, Group1 through Group4. In FIG. 8, the quantized residuals $a_0$ to $a_{15}$ may be grouped into four groups: Group1 including quantized residuals $a_0$ and $a_1$; Group2 including quantized residuals $a_2$, $a_3$, and $a_4$; Group3 including quantized residuals $a_5$ through $a_9$; and Group4 including quantized residuals $a_{10}$ through $a_{15}$.

In another approach, a non-power of-2 quantizer may be used in place of simple quantization. For example, an HEVC-style quantizer may be used, which would improve performance as long as the additional complexity is within the budget of the coder.

In yet another approach to the above-described technique, the quantized spatial residuals may be signaled using some other method, such as, for example, fixed-length coding or variable length code (VLC) coding using a dictionary, or the like. If VLC coding is used, the dictionary may be trained based on, for example, the expected statistics of the coding type.

Figure 9:
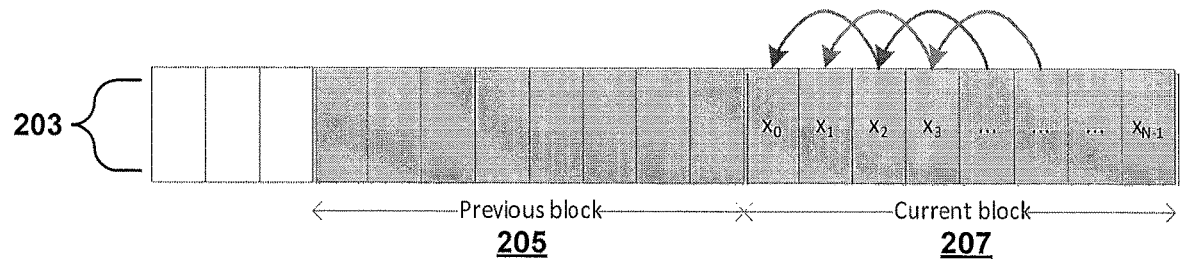
FIG. 9 is a block diagram illustrating a method of coding a line of a slice in accordance with aspects described in this disclosure.
Figure 10:
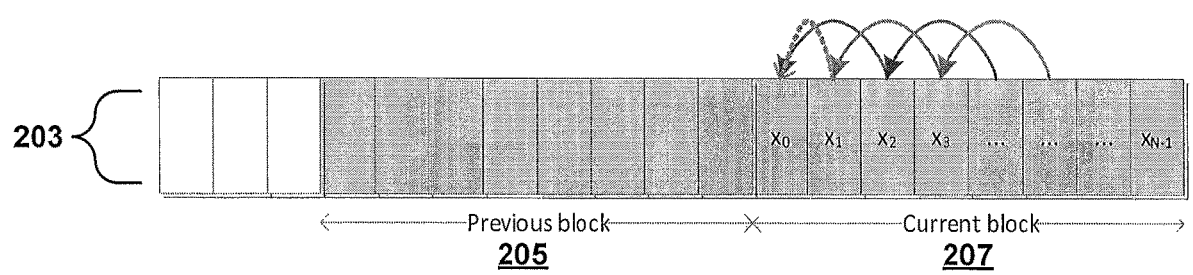
FIG. 10 is a block diagram illustrating another method of coding a line of a slice in accordance with aspects described in this disclosure.

FIG. 9 is a block diagram illustrating a method of coding a line of a slice in accordance with aspects described in this disclosure. FIG. 10 is a block diagram illustrating another method of coding a line of a slice in accordance with aspects described in this disclosure. In some implementations, the methods of FIGS. 9 and 10 may be applied to the first line in a slice. In particular, FIGS. 9 and 10 are techniques which illustrate implementations that respectively correspond to the method of FIG. 3. Accordingly, the same reference numerals designate the same elements as previously illustrated. Specifically, each of FIGS. 9 and 10 illustrates a portion of a slice which includes a first line 203 including a previous block 205 and a current block 207.

In the approach illustrated in FIGS. 9 and 10, the first n pixels in the current block 207 or 217 may be encoded explicitly in the bitstream, rather than being predicted from the previous reconstructed block 205 or 215. FIG. 9 illustrates the case where n=2 and FIG. 10 illustrates the case where n=1. An advantage of this approach is the total independence of the current block from previous reconstructed data. A higher bitrate per block may be expected with this approach. In a modification to this approach, the first n pixels may be encoded with some subset of the bitplanes removed. For example, if the scenario is rate-constrained then the PCM pixels may be truncated to a lower bit-depth before encoding.

The spatial prediction mode disclosed herein may be performed in any color space. For example, RGB or YCoCg may be used for this type of frame compression. It may be desirable to ensure that the predictors use the same color space as the current block. For example, if the current block is being processed in the YCoCg space but reconstructed pixels are stored in RGB, then a colorspace conversion of the reconstructed pixels should be performed.

The performance of the spatial prediction mode in accordance with aspects of this disclosure may be demonstrated by examining content which is difficult to code without it. In one example, image content is coded with and without the proposed mode. These examples may use a fixed rate 4:1 compression. Objective quality is measured using Peak Signal to Noise Ratio (PSNR), which is a common objective metric for image quality.

The rate control mechanism of the proposed codec may be designed to select the best coding mode for each block based on the trade-off between rate and distortion.

Especially for content in first lines of a slice, the proposed spatial prediction mode provides a low cost coding option in terms of the cost D+λ·R. Here, the parameter R refers to the bitrate of the current block, which may be the total number of bits transmitted between the encoder 20 and the decoder 30 for the current block; the parameter D refers to the distortion of the current block, which may be the difference between the original block and the reconstructed block. The parameter D may be computed in a number of different ways, for example, as the sum of absolute differences (SAD), sum of squared differences, etc. between the original and reconstructed blocks. The parameter λ is the Lagrangian parameter which may be a trade off between the parameters R and D. It is noted that the Lagrangian parameter λ may be calculated in various ways, and the selected approach to λ calculation may vary depending on the context and application. For example, Lagrangian parameter λ may be computed based on a number of factors, such as, the rate buffer 155 state, first line or non-first line conditions of the block, etc. Even for non-first lines of a slice conditions, the spatial prediction mode may be chosen for numerous types of image content.

Example Flowchart for Spatial Prediction Mode Coding

Figure 11:
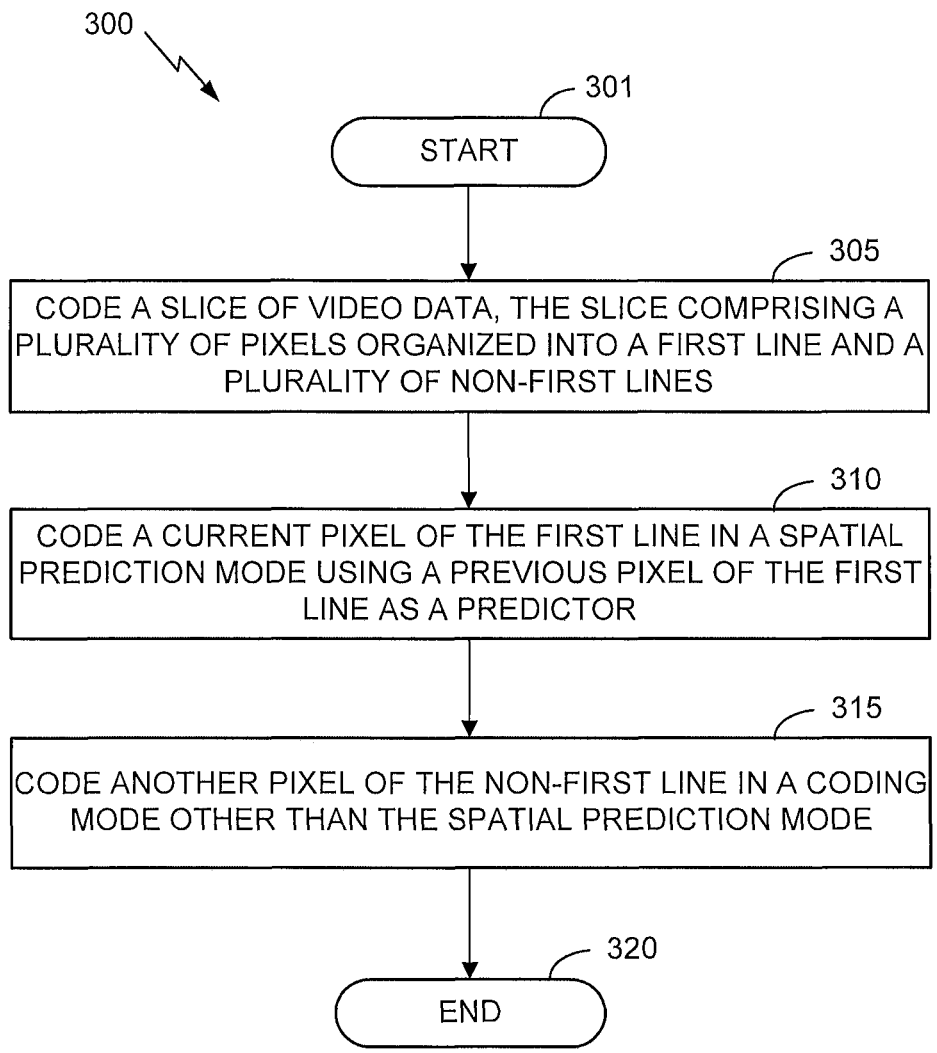
FIG. 11 is a flowchart illustrating a method for spatial prediction mode coding in accordance with aspects of the present disclosure.

With reference to FIG. 11, an example procedure for spatial prediction mode coding will be described. The steps illustrated in FIG. 11 may be performed by a video encoder (e.g., the video encoder 20 in FIG. 2A), a video decoder (e.g., the video decoder 30 in FIG. 2B), or component(s) thereof. For convenience, method 300 is described as performed by a video coder (also simply referred to as coder), which may be the video encoder 20, the video decoder 30, or another component.

The method 300 begins at block 301. At block 305, the coder codes a slice of video data. The slice comprises a plurality of pixels organized into a first line and a plurality of non-first lines. At block 310, the coder may code the slice via coding a current pixel of the first line in a spatial prediction mode using a previous pixel of the first line as a predictor. There may be an intervening pixel between the previous pixel and the current pixel. At block 315, the coder may continue to code the slice via coding at least another pixel of the non-first line in a coding mode other than the spatial prediction mode. The coding of the slice may further comprise coding the first line via first and second interleaved coding paths. Each of the pixels in the first and second coding paths may be coded independent from pixels outside of the corresponding coding path. The method 300 ends at block 320.

In the method 300, one or more of the blocks shown in FIG. 11 may be removed (e.g., not performed) and/or the order in which the method is performed may be switched. In some embodiments, additional blocks may be added to the method 300. The embodiments of the present disclosure are not limited to or by the example shown in FIG. 11, and other variations may be implemented without departing from the spirit of this disclosure.

OTHER CONSIDERATIONS

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, and algorithm steps described in connection with the embodiments disclosed herein may be implemented as electronic hardware, computer software, or combinations of both. To clearly illustrate this interchangeability of hardware and software, various illustrative components, blocks, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as devices or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Processor(s) in communication with (e.g., operating in collaboration with) the computer-readable medium (e.g., memory or other data storage device) may execute the instructions of the program code, and may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software or hardware configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Although the foregoing has been described in connection with various different embodiments, features or elements from one embodiment may be combined with other embodiments without departing from the teachings of this disclosure. However, the combinations of features between the respective embodiments are not necessarily limited thereto. Various embodiments of the disclosure have been described. These and other embodiments are within the scope of the following claims.

What is claimed is:

1. A method for coding video data via a plurality of coding modes in display link video compression, comprising:
   coding a slice of the video data, the slice comprising a plurality of pixels organized into a plurality of blocks, the blocks being arranged in a first line and a plurality of lines other than the first line, the coding of the slice comprising:
      coding a current pixel of the first line in a spatial prediction mode using a previous pixel of the first line as a predictor, wherein the current pixel of the first line and the previous pixel of the first line are separated by at least one intervening pixel and the number of intervening pixels between the current pixel and the previous pixel is fixed; and
      coding another pixel of one of the lines other than the first line in a coding mode other than the spatial prediction mode.

2. The method of claim 1, wherein:
   the coding of the slice of the video data further comprises coding the first line via first and second interleaved coding paths, each of the pixels in the first and second interleaved coding paths being coded independently of pixels outside of the corresponding interleaved coding path.

3. The method of claim 1, wherein each of the blocks is a two-dimensional (2D) block including at least two rows of pixels, wherein the current pixel and the previous pixel are in the same row, and wherein the coding of the slice of the video data further comprises coding each row of the first line via corresponding first and second interleaved coding paths, each of the pixels in the first and second interleaved coding paths being coded independently of pixels outside of the corresponding interleaved coding path.

4. The method of claim 1, further comprising coding a first pixel of the first line without prediction.

5. The method of claim 4, further comprising coding a second pixel of the first line of the slice without prediction, wherein the current pixel of the first line and the previous pixel of the first line are separated by an intervening pixel, the coding of the slice of the video data further comprising coding the first line via first and second interleaved coding paths, the first interleaved coding path beginning with the first pixel, the second interleaved coding path beginning with the second pixel, and each of the pixels in the first and second interleaved coding paths being coded independently of pixels outside of the corresponding interleaved coding path.

6. The method of claim 4, further comprising coding a second pixel of the first line in the spatial prediction mode using the first pixel of the first line as a predictor, the coding of the slice of the video data further comprising coding the first line via first and second interleaved coding paths, the first interleaved coding path beginning with the first pixel, the second interleaved coding path beginning with the second pixel, and each of the pixels in the first and second interleaved coding paths being coded independently of pixels outside of the corresponding interleaved coding path.

7. The method of claim 4, further comprising:
   determining whether there is a rate constraint on the coding of the video data; and
   truncating a bit depth of the first pixel in response to the determination that the rate constraint exists.

8. The method of claim 1, further comprising coding a first pixel of the first line in the spatial prediction mode using a default predictor, wherein the default predictor is dependent upon a bit-depth of the video data.

9. The method of claim 1, further comprising coding a current pixel of a current line in a median adaptive prediction (MAP) mode using a previous pixel of the current line and first and second pixels of a previous line as predictors, the current pixel of the current line and the previous pixel of the current line being separated by a first intervening pixel and the first and second pixels of the previous line being separated by a second intervening pixel, the coding of the slice of the video data further comprises coding the current line via first and second interleaved coding paths, each of the pixels in the first and second interleaved coding paths being coded independently of pixels outside of the corresponding interleaved coding path.

10. A device for coding video data via a plurality of coding modes in display link video compression, comprising:
   a memory configured to store the video data; and
   a processor in communication with the memory and configured to:
      code a slice of the video data, the slice comprising a plurality of pixels organized into a plurality of blocks, the blocks being arranged in a first line and a plurality of lines other than the first line;
      code a current pixel of the first line in a spatial prediction mode using a previous pixel of the first line as a predictor, wherein the current pixel of the first line and the previous pixel of the first line are separated by at least one intervening pixel and the number of intervening pixels between the current pixel and the previous pixel is fixed; and
code another pixel of one of the lines other than the first line in a coding mode other than the spatial prediction mode.

11. The device of claim 10, wherein:
the processor is further configured to code the first line via first and second interleaved coding paths, each of the pixels in the first and second interleaved coding paths being coded independently of pixels outside of the corresponding interleaved coding path.

12. The device of claim 10, wherein each of the blocks is a two-dimensional (2D) block including at least two rows of pixels, wherein the current pixel and the previous pixel are in the same row, and wherein the processor is further configured to code each row of the first line via corresponding first and second interleaved coding paths, each of the pixels in the first and second interleaved coding paths being coded independently of pixels outside of the corresponding interleaved coding path.

13. The device of claim 10, wherein the processor is further configured to code a first pixel of the first line without prediction.

14. The device of claim 13, wherein the processor is further configured to code a second pixel of the first line without prediction, the coding of the slice of the video data further comprising coding the first line via first and second interleaved coding paths, the first interleaved coding path beginning with the first pixel, the second interleaved coding path beginning with the second pixel, and each of the pixels in the first and second interleaved coding paths being coded independently of pixels outside of the corresponding interleaved coding path.

15. The device of claim 13, wherein the processor is further configured to:
code a second pixel of the first line in the spatial prediction mode using the first pixel of the first line as a predictor; and
code the first line via first and second interleaved coding paths, the first interleaved coding path beginning with the first pixel, the second interleaved coding path beginning with the second pixel, and each of the pixels in the first and second interleaved coding paths being coded independently of pixels outside of the corresponding interleaved coding path.

16. The device of claim 13, wherein the processor is further configured to:
determine whether there is a rate constraint on the coding of the video data; and
truncate a bit depth of the first pixel in response to the determination that the rate constraint exists.

17. The device of claim 10, wherein the processor is further configured to code a first pixel of the first line in the spatial prediction mode using a default predictor, wherein the default predictor is dependent upon a bit-depth of the video data.

18. The device of claim 10, wherein the processor is further configured to code a current pixel of a current line in a median adaptive prediction (MAP) mode using a previous pixel of the current line and first and second pixels of a previous line as predictors, the current pixel of the current line and the previous pixel of the current line being separated by a first intervening pixel and the first and second pixels of the previous line being separated by a second intervening pixel, the coding of the slice of the video data further comprises coding the current line via first and second interleaved coding paths, each of the pixels in the first and second interleaved coding paths being coded independently of pixels outside of the corresponding interleaved coding path.

19. An apparatus, comprising:
means for coding a slice of the video data, the slice comprising a plurality of pixels organized into a plurality of blocks, the blocks being arranged in a first line and a plurality of lines other than the first line;
means for coding a current pixel of the first line in a spatial prediction mode using a previous pixel of the first line as a predictor, wherein the current pixel of the first line and the previous pixel of the first line are separated by at least one intervening pixel and the number of intervening pixels between the current pixel and the previous pixel is fixed; and
means for coding another pixel of one of the lines other than the first line in a coding mode other than the spatial prediction mode.

20. The apparatus of claim 19, further comprising:
means for coding the first line via first and second interleaved coding paths, each of the pixels in the first and second interleaved coding paths being coded independently of pixels outside of the corresponding interleaved coding path.

21. The apparatus of claim 19, wherein each of the blocks is a two-dimensional (2D) block including at least two rows of pixels, wherein the current pixel and the previous pixel are in the same row, and wherein the apparatus further comprises means for coding each row of the first line via corresponding first and second interleaved coding paths, each of the pixels in the first and second interleaved coding paths being coded independently of pixels outside of the corresponding interleaved coding path.

22. The apparatus of claim 19, further comprising means for coding a first pixel of the first line without prediction.

23. The apparatus of claim 22, further comprising:
means for coding a second pixel of the first line without prediction; and
means for coding the first line via first and second interleaved coding paths, the first interleaved coding path beginning with the first pixel, the second interleaved coding path beginning with the second pixel, and each of the pixels in the first and second interleaved coding paths being coded independently of pixels outside of the corresponding interleaved coding path.

24. The apparatus of claim 22, further comprising:
means for coding a second pixel of the first line in the spatial prediction mode using the first pixel of the first line as a predictor; and
means for coding the first line via first and second interleaved coding paths, the first interleaved coding path beginning with the first pixel, the second interleaved coding path beginning with the second pixel, and each of the pixels in the first and second interleaved coding paths being coded independently of pixels outside of the corresponding interleaved coding path.

25. The apparatus of claim 22, further comprising:
means for determining whether there is a rate constraint on the coding of the video data; and
means for truncating a bit depth of the first pixel in response to the determination that the rate constraint exists.

26. A non-transitory computer readable storage medium having stored thereon instructions that, when executed, cause a processor of a device to:
code a slice of the video data, the slice comprising a plurality of pixels organized into a plurality of blocks, the blocks being arranged in a first line and a plurality of lines other than the first line;

code a current pixel of the first line in a spatial prediction mode using a previous pixel of the first line as a predictor, wherein the current pixel of the first line and the previous pixel of the first line are separated by at least one intervening pixel and the number of intervening pixels between the current pixel and the previous pixel is fixed; and code another pixel of one of the lines other than the first line in a coding mode other than the spatial prediction mode.

27. The non-transitory computer readable storage medium of claim 26, further having stored thereon instructions that, when executed, cause the processor to:

code the first line via first and second interleaved coding paths, each of the pixels in the first and second interleaved coding paths being coded independently of pixels outside of the corresponding interleaved coding path.

28. The non-transitory computer readable storage medium of claim 26, wherein each of the blocks is a two-dimensional (2D) block including at least two rows of pixels, wherein the current pixel and the previous pixel are in the same row, and wherein the non-transitory computer readable storage medium further has stored thereon instructions that, when executed, cause the processor to code each row of the first line via corresponding first and second interleaved coding paths, each of the pixels in the first and second interleaved coding paths being coded independently of pixels outside of the corresponding interleaved coding path.

29. The non-transitory computer readable storage medium of claim 26, farther having stored thereon instructions that, when executed, cause the processor to code a first pixel of the first line without prediction.

30. The non-transitory computer readable storage medium of claim 29, further having stored thereon instructions that, when executed, cause the processor to:

code a second pixel of the first line without prediction; and code the first line via first and second interleaved coding paths, the first interleaved coding path beginning with the first pixel, the second interleaved coding path beginning with the second pixel, and each of the pixels in the first and second interleaved coding paths being coded independently of pixels outside of the corresponding interleaved coding path.

31. The method of claim 1, wherein a distance between the current pixel and the previous pixel of the first line is fixed.

32. The method of claim 1, wherein the coding of the slice further comprises:

coding a second pixel of a second one of the lines other than the first line in the spatial prediction mode using a third pixel of the second line as a predictor, wherein the second pixel of the second line and the third pixel of the second line are separated by at least one intervening pixel, wherein the number of intervening pixels between the second pixel and the third pixel is fixed, and wherein the number of intervening pixels between the second pixel and the third pixel of the second line is different from the number of intervening pixels between the current pixel and the previous pixel of the first line.

33. The method of claim 1, further comprising coding an additional slice of the video data, the coding of the additional slice comprising:

coding a current pixel of a first line of the additional slice in the spatial prediction mode using a previous pixel of the first line as a predictor, wherein the current pixel and the previous pixel of the first line of the additional slice are separated by at least one intervening pixel and the number of intervening pixels between the current pixel and the previous pixel of the additional slice is fixed, wherein the number of intervening pixels between the current pixel and the previous pixel in the additional slice is different from the number of intervening pixels between the current pixel and the previous pixel in the slice.

34. The device of claim 10, wherein a distance between the current pixel and the previous pixel of the first line is fixed.

35. The device of claim 10, wherein the processor is further configured to code the slice via coding a second pixel of a second one of the lines other than the first line in the spatial prediction mode using a third pixel of the second line as a predictor, wherein the second pixel of the second line and the third pixel of the second line are separated by at least one intervening pixel, wherein the number of intervening pixels between the second pixel and the third pixel is fixed, and wherein the number of intervening pixels between the second pixel and the third pixel of the second line is different from the number of intervening pixels between the current pixel and the previous pixel of the first line.

36. The device of claim 10, wherein the processor is further configured to:

code a current pixel of a first line of an additional slice of the video data in the spatial prediction mode using a previous pixel of the first line as a predictor, wherein the current pixel and the previous pixel of the first line of the additional slice are separated by at least one intervening pixel and the number of intervening pixels between the current pixel and the previous pixel of the additional slice is fixed, wherein the number of intervening pixels between the current pixel and the previous pixel in the additional slice is different from the number of intervening pixels between the current pixel and the previous pixel in the slice.

* * * * *